United States Patent [19]

Pedersen

[11] Patent Number: 5,032,379
[45] Date of Patent: Jul. 16, 1991

[54] ALUMINA SUITABLE FOR CATALYTIC APPLICATIONS

[75] Inventor: Lee A. Pedersen, Shaler Township, Allegheny County, Pa.

[73] Assignee: Aluminum Company of America, Pittsburgh, Pa.

[21] Appl. No.: 712,872

[22] Filed: Mar. 18, 1985

Related U.S. Application Data

[63] Continuation-in-part of Ser. No. 670,765, Nov. 13, 1984, abandoned.

[51] Int. Cl.⁵ .................... C01F 7/02; B01J 21/04
[52] U.S. Cl. .................. 423/628; 423/127; 423/625; 502/439; 502/355
[58] Field of Search ........................ 423/628

[56] References Cited

U.S. PATENT DOCUMENTS 3,850,849 11/1974 Kiovsky et al. ............. 423/628
3,853,789 12/1974 Warthen et al. ............. 423/628
3,898,322 8/1975 Leach .......................... 423/628
4,301,033 11/1981 Takumi et al. ............... 423/628
4,301,037 11/1981 Sanchez et al. .............. 423/628
4,315,839 2/1982 Bouge et al. ................. 423/628
4,356,113 10/1982 Lim et al. .................... 423/628
4,390,456 6/1983 Sanchez et al. .............. 423/628

Primary Examiner—Gary P. Straub
Assistant Examiner—Steven J. Bos
Attorney, Agent, or Firm—Daniel A. Sullivan, Jr.; Douglas P. Mueller

[57] ABSTRACT

Alumina having greater than 0.4 cc/g pore volume in the range 30 to 200 Angstroms pore diameter.

A catalyst containing gamma alumina but essentially no eta alumina.

The method of tailoring pore size distribution comprising bonding mixtures of particles of rehydration bondable alumina of different particle porosity.

9 Claims, 9 Drawing Sheets

| CATALYST | CATALYST REMOVED AT THE END OF (MINUTES) | C% | H% | C/H |
|---|---|---|---|---|
| HDN-3 | 90 | 4.17 | 1.63 | 2.56 |
| HDN-3 | 540 | 3.27 | 1.89 | 1.73 |
| HDN-7 | 90 | 3.29 | 1.63 | 2.02 |
| HDN-7 | 540 | 2.38 | 1.70 | 1.40 |

FIG.7

| SAMPLE NO. | 6 | 14 | 13 | 15 |
|---|---|---|---|---|
| ACTIVATION TEMPERATURE, °C | 425 | 600 | 700 | 900 |
| PROPERTIES-SUBSTRATE ACTIVATED: | | | | |
| XRD | GAMMA-CHI | GAMMA | GAMMA | DELTA |
| SURFACE AREA, $m^2/g$ | 350 | 200 | 180 | 110 |
| ACTIVITY-CATALYST k, goil/gcat·hr | 25.5 | 25.5 | 24.6 | 18.4 |

ALUMINA SUITABLE FOR CATALYTIC APPLICATIONS

CROSS-REFERENCE TO RELATED APPLICATION

This application is a continuation-in-part application of U.S. Ser. No. 670,765, filed Nov. 13, 1984, now abandoned.

SUMMARY OF THE INVENTION

It is an object of the invention to provide alumina products suitable for catalytic applications.

This as well as other objects which will become apparent from the discussion that follows are achieved, according to the present invention, by: (1) alumina having greater than 0.4 cc/g pore volume in the range 30 to 200 Angstroms pore diameter; (2) a catalyst containing gamma alumina but essentially no eta alumina; and (3) the method of tailoring pore size distribution comprising bonding mixtures of particles of rehydration bondable alumina of different particle porosity.

BRIEF DESCRIPTION OF THE DRAWING

FIG. 7 is a tabular presentation of carbon and hydrogen content for catalysts HDN-3 and -7.

FIG. 8 is a tabular presentation of k versus activation temperature.

DESCRIPTION OF THE PREFERRED EMBODIMENTS

Figure 1:
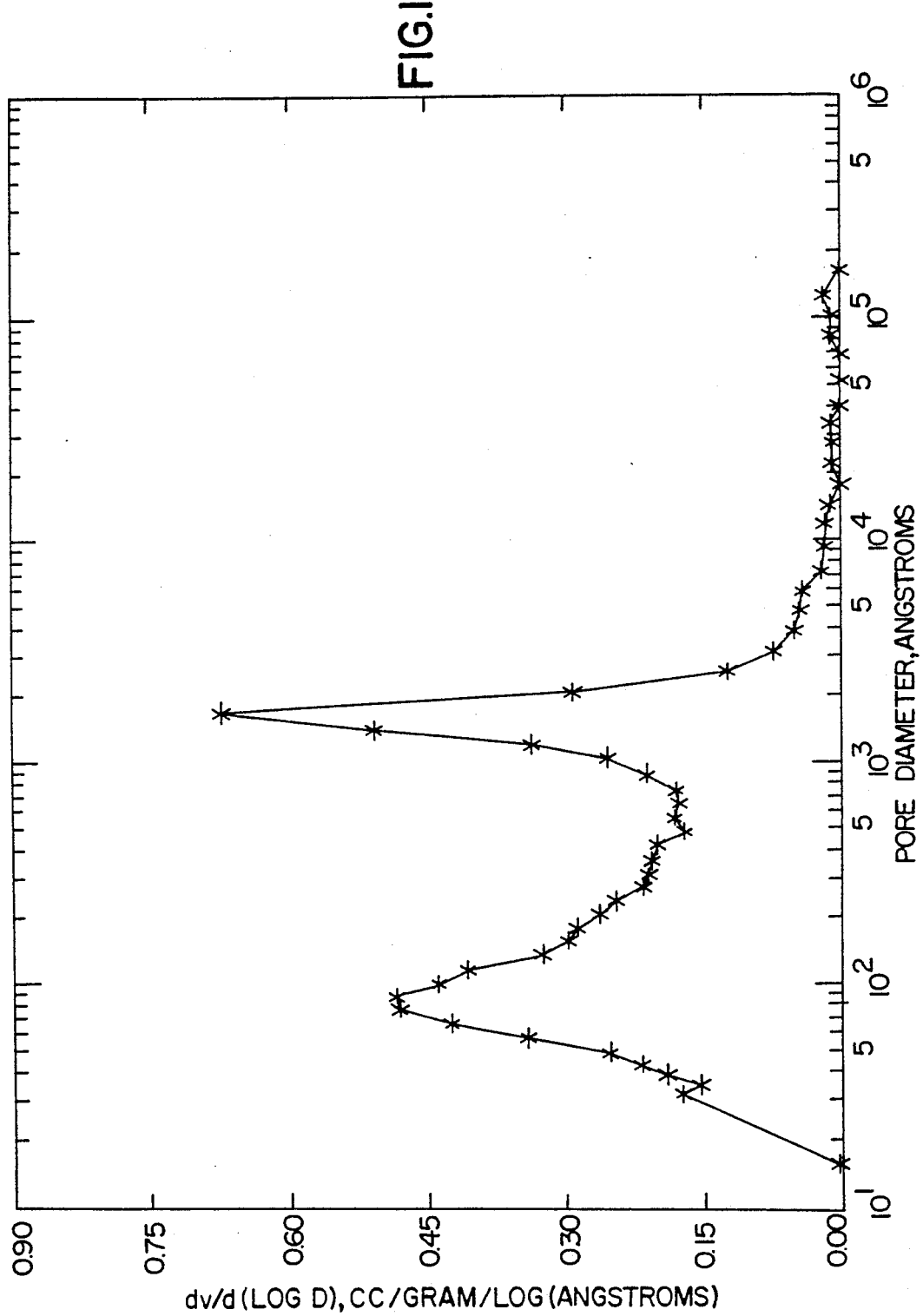
FIGS. 1 and 3-6 provide pore size distribution information.

In recent years the effect of the morphology of the substrate on catalytic activity seems to have been of major concern only in the patent literature. The impact of support microstructure has had cursory attention in scientific publications. We will be describing hereinafter the preparation and characterization of pure alumina substrates having tailored pore size distributions and having differences in alumina phase composition. Hydrodenitrogenation (HDN) of synthetic crude from shale has been used in these evaluations as a probe to evaluate how differences in alumina properties influence the activity of finished Ni-Mo catalysts.

Our experimental approach was multifaceted. The substrates were modified by controlling the conditions of formation and subsequent heat treatment. Ni and Mo were incorporated onto the heat treated aluminas by successive impregnation, drying, and calcination steps. Substrates and some catalysts were characterized for their porosity with Hg porosimetry and phase composition with XRD. The relationship between coking and pore properties was examined by obtaining C/H ratios of catalysts at two different stages in the run. HDN of shale synthetic crude was quantified using a batch-type stirred autoclave reactor at 400° C. and 1000 psi. The catalyst was ground to −100+200 mesh size. Total nitrogen content was determined by chemiluminescence on an Antek N analyzer. Nitrogen ppms versus time of reaction was plotted to get pseudo-first order rate constants, or k values. These k's have been a very useful tool for comparing catalysts.

By altering the morphology of the alumina, catalysts have been produced with HDN activity 10-40% better than the activity of a well-regarded commercial sample tested under the same conditions. An unmistakable linkage has been observed between the pore size distribution of the support and the k value. The primary focus of the research has been the identifying of the substrate characteristics needed to make a superior HDN catalyst. A break in the pseudo-first order plots, indicative of a drop in the level of the activity, has been noted. An auxiliary region of research was the relationship between the character of the break and potential causes including pore blockage by coke and the nature of the nitrogen compounds in a feed.

Characteristic of the substrates disclosed herein is a high pore volume, e.g. greater than 0.4, preferably greater than 0.9 cc/g, coupled with high surface area, e.g. greater than 300 m²/g. With the high catalytically active metal oxide loading, the surface of the finished catalyst is still around 200 m²/g.

The success of this invention in nitrogen removal indicates potential for removal of other contaminants, such as sulfur, oxygen, and metals, e.g. Ni and V, to create new compounds lacking these elements.

Further illustrative of the present invention are the following examples where the NiO and MoO₃ percentages remained constant throughout. The sample numbering system used in the original experimental work is preserved for the most part and is of the form "HDN" (for "hydrodenitrogenation") followed by a number.

EXAMPLE I

The following was the procedure for making the alumina substrate for one of the most active shale synthetic-crude HDN catalysts, this one having the designation HDN-8.

The materials below bearing the Aluminum Company of America designation "CP" are rehydration bondable aluminas which means that upon hydration or hydrothermal treatment the particles will bond or coalesce. The nominal median particle sizes are as follows: CP-1 1 micron; CP-05 0.3 microns. Further information on these materials is to be found in the following adapted from U.S. patent application Ser. Nos. 553,101, now abandoned, and 582,934, now U.S. Pat. No. 4,579,839, of Alan Pearson.

Rehydration Bondable Alumina Particles

In order to achieve initial activation, hydrated alumina, i.e. Al(OH)₃, is rapidly heated to create a porous, poorly crystallized, reactive alumina structure. This step is, per se, well known in the art, and discussed in e.g. U.S. Pat. Nos. 2,915,365 and 3,222,129. A preferred method of initial activation is described in U.S. Pat. No. 4,051,072, column 3, line 46, to column 4, line 7, which portion is incorporated herein by reference. Preferred activation conditions are inlet air temperature of 700° to 870° C., outlet temperature of 350° to 500° C. and a powder residence time of less than 3 seconds. This "partially calcined" or "activated" powder typically has a residual water content of about 4 to 12%, as measured by weight loss on heating from 250° to 1100° C. A significant property of the powder for this invention is that it must rehydration bond to bond the individual powder particles together in a reasonable time during a forming step as set forth, for example, in Steps (5) and (6) of the Alumina Preparation Procedure in this Example below.

Suitable activated powder is e.g. Alcoa Activated Alumina Powders CP-1 of Aluminum Company of America. The CP Powders are rehydratable and form a hydroxyl bond upon contact with water. The rehydration reaction is exothermic. Typical physical properties for CP powders appear in Table I. The median particle sizes are the "50% <" entries.

TABLE I

| Alcoa Activated Alumina Powders | | | | |
|---|---|---|---|---|
| | CP-7 | CP-1 | CP-5 | CP-05 |
| Typical Physical Properties | | | | |
| XRD Analysis, major | amorphous | amorphous | amorphous | amorphous |
| Size,** | | | | |
| 90 mass-% <, microns | 20.0 | 2.5 | 10 | 2.5 |
| 50 mass-% <, microns | 7.5 | 0.9 | 4.3 | 0.2 |
| 10 mass-% <, microns | 1.3 | 0.4 | 0.6 | 0.2 |
| LBD, lbs/ft$^3$ (approx.) | 34 | 18 | — | — |
| PBD, lbs/ft$^3$ (approx.) | 43 | 26 | — | — |
| SA, m$^2$/g | 325* | 340* | 340* | 340* |
| Typical Chemical Properties - wt % | | | | |
| Al$_2$O$_3$ | 93.1 | 92.8 | 93.2 | 92.7 |
| SiO$_2$ | 0.02 | 0.06 | 0.02 | 0.05 |
| Fe$_2$O$_3$ | 0.02 | 0.03 | 0.02 | 0.03 |
| Na$_2$O (Total) | 0.35 | 0.45 | 0.44 | 0.64 |
| Na$_2$O Water Soluble (%) | 30 | 40 | — | — |
| LOI (250-1100 or 1200° C.) (%) | 6.5 | 6.5 | 6.3 | 6.5 |

*on rehydration/activation
**Size in terms of particle diameter as determined by a Micromeritics Sedigraph
XRD = X-ray diffraction
LBD = Loose bulk density
PBD = Packed bulk density
SA = Surface area
LOI = Loss on ignition
— = not measured The CP-1 particles have a different pore size distribution, i.e. different particle porosity, from that of the particles of CP-05. Mixing various ratios of CP-1 particles with CP-05 particles consequently permits tailoring of pore size distribution. To repeat, the pore size distribution of the mixture is a function of the relative proportions of CP-1 and CP-05 material in the mixture. Combining two or more particle types of different individual-particle pore diameter size distributions leads to the ability to tailor-make new grades of rehydration bondable alumina exhibiting pore diameter size distributions different from those of the starting materials.

The following Table II gives the percentage of pore volume in the different Angstrom size ranges for three different CP powders, as based on N$_2$ desorption using an Omicron nitrogen adsorption-desorption apparatus. Also given is the median pore diameter, above which and below which 50% of the pore volume lies.

TABLE II

| Pore Diameter Range | CP-05 | CP-1 | CP-5 |
|---|---|---|---|
| | Pore Volume Percent | | |
| >600 | 44.4 | 54.6 | 20.8 |
| 600-400 | 15.9 | 14.4 | 7.9 |
| 400-200 | 24.4 | 12.8 | 8.1 |
| 200-100 | 6.3 | 1.0 | 4.3 |
| 100-80 | 0.1 | 0.3 | 1.7 |
| 80-60 | 0.3 | 0.4 | 2.4 |
| 60-40 | 0.2 | 1.5 | 8.8 |
| 40-20 | 8.4 | 15.0 | 46.0 |
| 20-10 | 0 | 0 | 0 |
| 50% pore volume Median Dia, A | 520 | 640 | 45 |

Note: Alumina having two very distinct major pore size range modes such as that demonstrated by CP-5 alumina above is termed a support with bimodal pore distribution or a bimodal support. The CP-1 material contained phosphate dispersant residue. A disadvantageous aspect of CP-5 alumina is the high quantity of pore volume at the small pore diameter end of the distribution. Thus, there is 46% in the 40-20 range, compared with, respectively, 8.4 and 15% for CP-05 and CP-1 material. These small pores tend to plug faster with-e.g. carbon deposits.

Alumina Preparation Procedure (1) 50 g of CP-1 powder, 50 g of CP-05 powder, and 135.3 g of water were weighed out.
(2) The water was poured into a pyrex beaker.
(3) The CP powders were added to the water in the beaker and stirred with a glass rod until homogeneous, approximately 1 to 2 minutes.
(4) The slurry was poured into a 2¼" diameter, 8 oz. plastic bottle to a depth of approximately 1".
(5) The slurry cast was then placed in a hot water bath at a specified temperature of 60° C. for aging. The slurry cast was not submerged. When the cast began to set up or dry on top after several minutes, water was added to the top to keep it wet.
(6) After 4 hours, the cast was removed from the hot bath. The cast was then removed from the bottle mold and dried at 110° C. overnight.
(7) The sample was sized to ¼" diameter lumps and activated at 425° C.
(8) The sample was sized —100+200 mesh for catalyst preparation.

Preparation of Catalyst HDN-8

1. The above-prepared alumina substrate, which is a 50:50 weight mixture of CP-1 and CP-05 powders, had a He density (g/cc) of 3.02, surface area 352 m$^2$/g and the following pore size distribution:

| Hg Porosity Pore Diameter | Pore Volume, cc/g |
|---|---|
| 30-1000 A | 0.95 |
| 30-100 A | 0.39 |
| 100-500 A | 0.39 |
| 500-1000 A | 0.17 |
| 100-200 A | 0.25 |
| 200-400 A | 0.15 |

The "A" in the Table above stands for Angstroms.

FIG. 1 presents the pore volume information graphically. The area under the curve gives the pore volume. Note that two peaks are present in the curve.

To further explain FIG. 1, it is a plot of the derivative of the pore volume (V in cc/g) versus ln D (pore diameter in Angstroms). The derivative values have been ln normalized (i.e., dV is divided by log d$_2$ — ln d$_1$, instead of d$_2$ — d$_1$). This correction allows one to calculate the pore volume associated with a particular pore size range by calculating the area under the peak. For example, FIG. 1 for HDN-8 shows a bimodal distribution with peaks around 100 and around 1000 Angstroms, and the pore volumes are approximately 0.41 cc/g (30% of total pore volume) and 0.82 cc/g (59% of total pore volume), respectively.

Three grams of this material were carefully weighed out in an evaporating dish.

2. An amount equalling 0.921 g of Ni(NO$_3$)$_2$·6H$_2$O (Formula Weight=290.81) was dissolved in 10 ml of deionized water.

3. This nickel nitrate solution was added to the alumina substrate, the solution being kept slightly more then enough to cover the powder completely. The dish was then heated under infrared light and the solution was allowed to evaporate slowly and uniformly by stirring to avoid any lumping or agglomeration. This operation, called impregnation, took approximately 15 minutes.

4. The product from Step 3 was dried in an oven at 120° for 18 hours and then calcined at a temperature of 400° C. for a period of 4 hours in a gentle flow of air.

5. The product of Step 4 was impregnated with a solution of 0.874 g of ammonium heptamolybdate (Formula Weight=1235.6) in 12 ml of deionized water. This impregnation treatment also required approximately 18 minutes and resembled the procedure of Step 3.

6. The product was then dried at 120° C. for 18 hours.

7. The dried product of Step 6 was calcined at 400° C. for 4 hours with a gentle flow of air in the calcination oven.

8. The calcined product of Step 7 constituted the catalyst HDN-8 containing about 6 wt % NiO and 18 wt % $MoO_3$. Its pore size distribution was as presented in FIG. 1.

9. The catalyst was further treated by presulfiding prior to testing. This sulfiding procedure was as follows: 1.0018 g of the catalyst was carefully weighed out in a quartz boat and placed in a pyrex tube which was heated in a quartz tube in a tubular furnace. The temperature was raised to 350° C. over a period of two hours and maintained at this temperature for a period of 1 hour with helium flowing at 100 cc per minute. At the end of the heating period, the gas was changed to a mixture of 10% $H_2S$ in hydrogen and passed over the catalyst for a period of 2 hours at the same flow rate. The oven was then turned off and allowed to cool, and the flow was reduced to 40 ml per minute. When the catalyst was cooled sufficiently, the boat was removed from the tube and the catalyst was immediately slurried in hexadecane.

Figure 9:
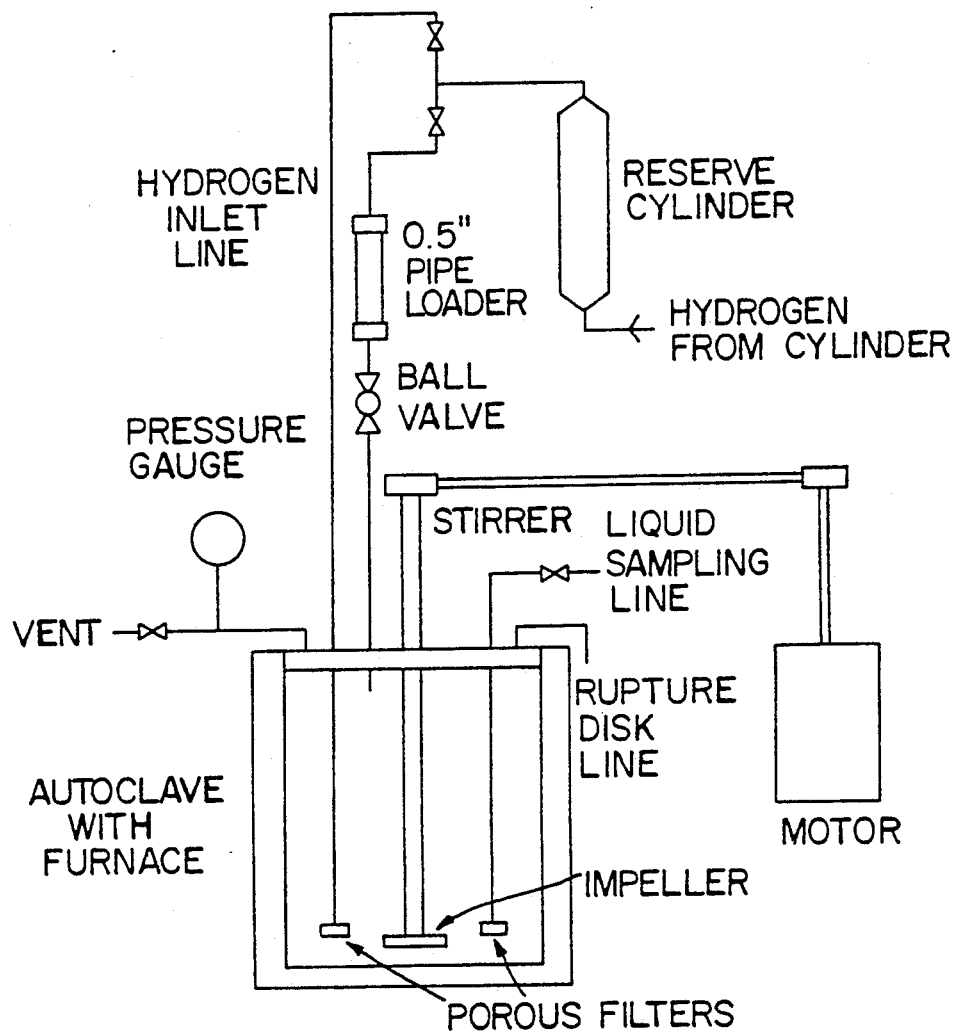
FIG. 9 is a schematic presentation of a batch reactor system.

10. FIG. 9 shows the batch reactor system which was used to test the catalyst for HDN (hydrodenitrogenation) activity. The catalyst in the slurried, sulfided form was transferred to the autoclave vessel (300 cc, Autoclave Engineering), hexadecane being used to wash the catalyst out of the container and into the autoclave. The reactor vessel also contained 1.5 g of $CS_2$ to keep the catalyst in the sulfided form.

11. 4.5 g of synthetic crude extracted from shale (Paraho type) was carefully weighed out and placed in the loader. Again, hexadecane is used to wash out any remainder of the synthetic crude to the loader. The loader is a temporary storage vessel associated with the reactor.

12. The reactor system contained 1.0018 g of catalyst HDN-8, 4.5 g of synthetic crude and 150.6 g of hexadecane. The autoclave vessel was closed and the loader was also connected to the system. The vessel was stirred with an impeller at 1500 rpm to keep the catalyst well dispersed in the liquid medium. The loader was pressurized to 1300 psig with $H_2$ and checked for leaks. The $H_2$ was released and a very small amount of $H_2$ was allowed in the reactor.

13. The reactor vessel was heated to 400° C. over a 1 hour period and a sample was drawn to check for the absence of any synthetic crude in the reactor. The loader was pressured to about 1100 psig. At time "t"=0, the contents in the loader were injected into the reactor. Concomitantly, the pressure in the reactor was brought to 1000 psig with $H_2$. The temperature decreased by 10°-15° C. but in 1-2 minutes time, the required 400° C. temperature was recovered and thereafter kept constant. At different intervals, the samples are withdrawn and cooled to room temperature. During sampling, the pressure is kept constant at about 1000 psig.

14. A set of known samples of N in hexadecane were evaluated in the analyzer to calibrate it before each experiment. From a plot of counts (of the analyzer) vs. concentration, the concentration of N in the withdrawn samples is determined. The data is presented in Table III.

TABLE III

| N Analysis | | |
|---|---|---|
| Standard Calibration | | |
| Mg/ml | Average Counts | |
| 102 | 1248 | |
| 198 | 2480 | |
| 300 | 3629 | |
| 402 | 4728 | |
| 504 | 5647 | |
| 588 | 6461 | |
| Experimental Run HDN-8 | | |
| Time In Minutes | Sample No. | Average Counts | Concentration |
| 5 | 01 | 6092 | 551 |
| 35 | 02 | 5310 | 462 |
| 93 | 03 | 4340 | 368 |
| 145 | 04 | 3733 | 310 |
| 211 | 05 | 3055 | 249 |
| 284 | 06 | 2690 | 215 |
| 366 | 07 | 2202 | 175 |
| 446 | 08 | 1725 | 137 |
| 533 | 09 | 1403 | 110 |

15. A semilogarithmic plot of concentration vs. time was drawn, and the slope of the plot was normalized by dividing by grams of catalyst per gram of liquid phase, or "oil" ("oil" is used herein as a shorthand term to refer to the liquid phase, which is composed mainly of the hexadecane and includes the synthetic crude from shale and any other additives, such as the $CS_2$), to give the k value in units of $g_{oil}/(g_{cat} \text{hours})$ 16. After the reaction was over, the used catalyst was recovered and washed with acetone. This can be tested for coking by C/H ratio.

Raw Data For HDN-8

| Raw Data For HDN-8 | |
|---|---|
| wt of catalyst HDN-8 = | 1.0018 g |
| wt of hexadecane = | 150.6 g |
| wt of synthetic crude = | 4.5 g |
| wt of $CS_2$ = | 1.5 g |
| Total wt of liquids = | 156.6 g |

This data plotted as log of total nitrogen concentration versus time in minutes yields a normalized slope of $k = 27.2 \ g_{oil}/(g_{cat} \text{hours})$.

Unless otherwise noted herein, the k values are determined by a "least squares" evaluation of the data. The correlation number is greater than 94% in all cases.

Looking at the data without a least squares analysis, the above-referenced break in the pseudo-first order plot for this Example occurred at around 120 minutes, where the original k value of 42.9 went through a transition to become 25.7. The reason for this behavior may be attributable to exhaustion of easily hydrodenitrogenated chemicals in the 4.5 gram synthetic crude aliquots used in the batch-type experiments of this disclosure.

In Step 3 above, there can be used instead of the Ni stipulated, Co, Fe, Cu, Zn, Cd and the lanthanide elements, and/or mixtures thereof, to produce the corresponding oxides.

In Step 5 above, there can be used instead of the Mo salt, salts of W, Nb, Ta, Te, V, heteropoly acids generally, and/or mixtures thereof, to produce the corresponding oxides.

Together with the alumina stipulated in Step 1, there can be used promoter quantities of oxide of Zr, Ti, Cr, Si, alkali earths, lanthanides and/or their mixtures or solid state reaction products, preferably in a quantity of up to 10%.

EXAMPLES II to V

These catalysts are HDN-3, 7, 9, and 2. They were prepared and tested in the same way as done for catalyst HDN-8 in Example I, the only differences being in alumina substrate preparation.

Figure 2:
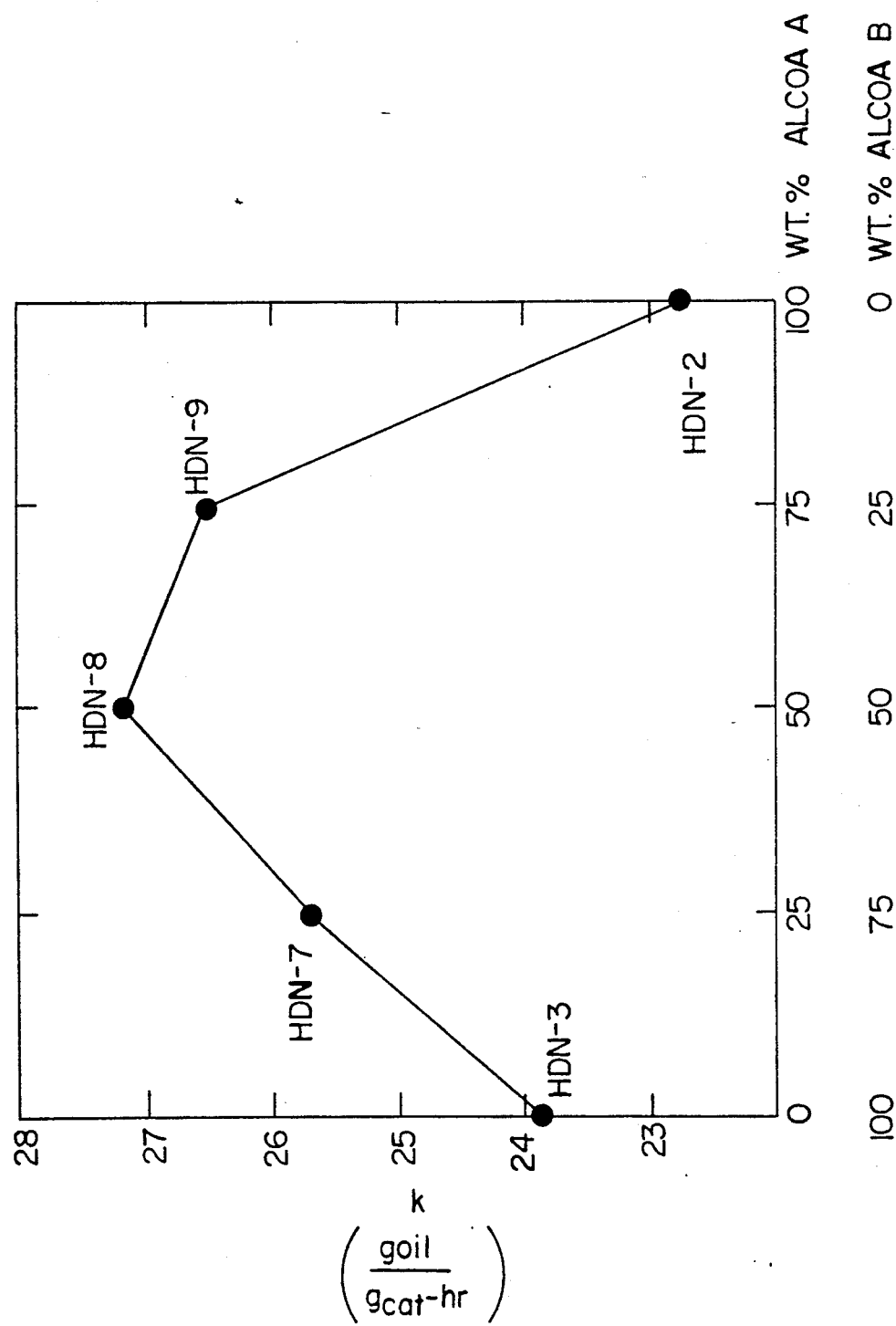
FIG. 2 is a plot of k versus substrate composition.
Figure 3:
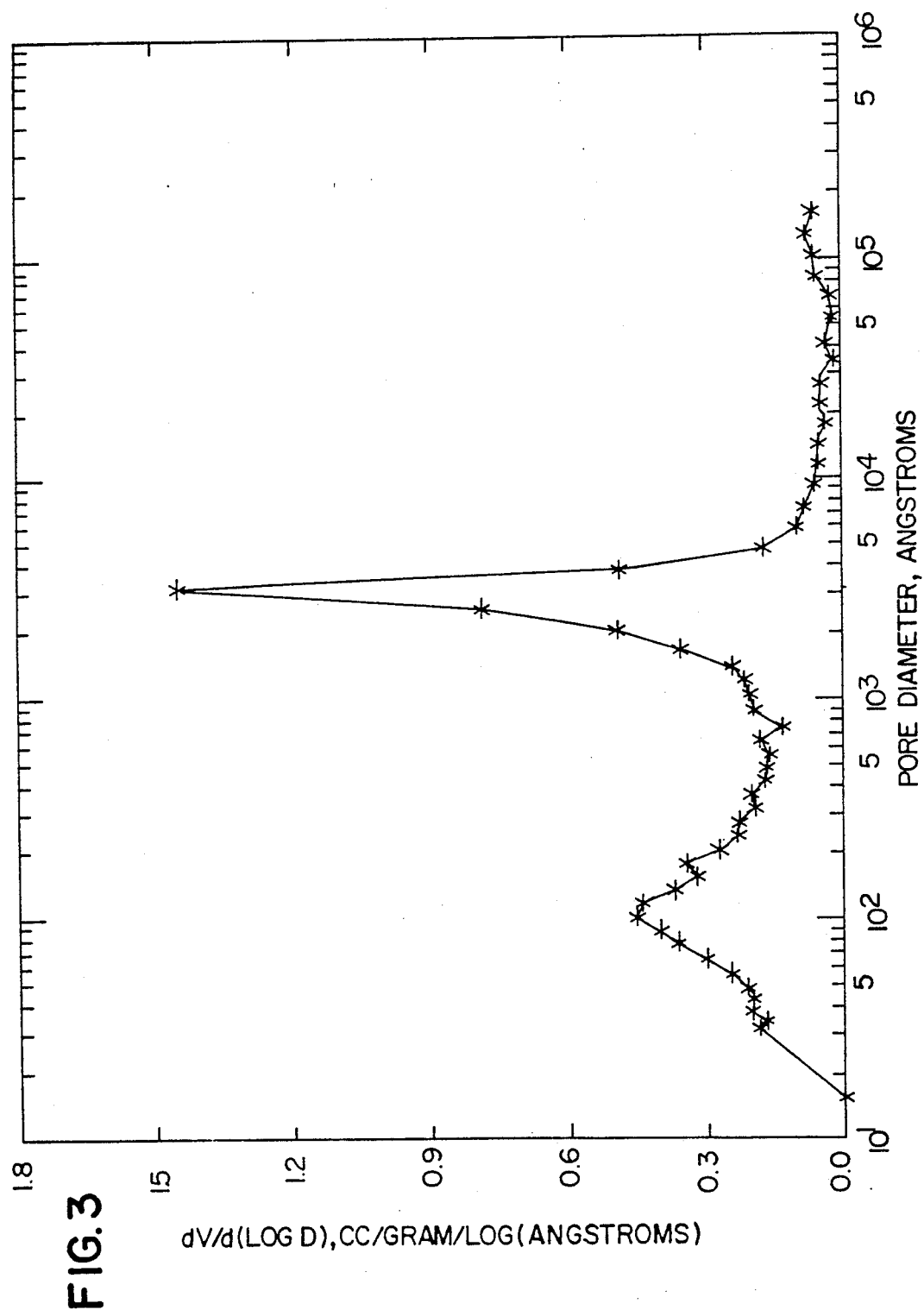
Figure 4:
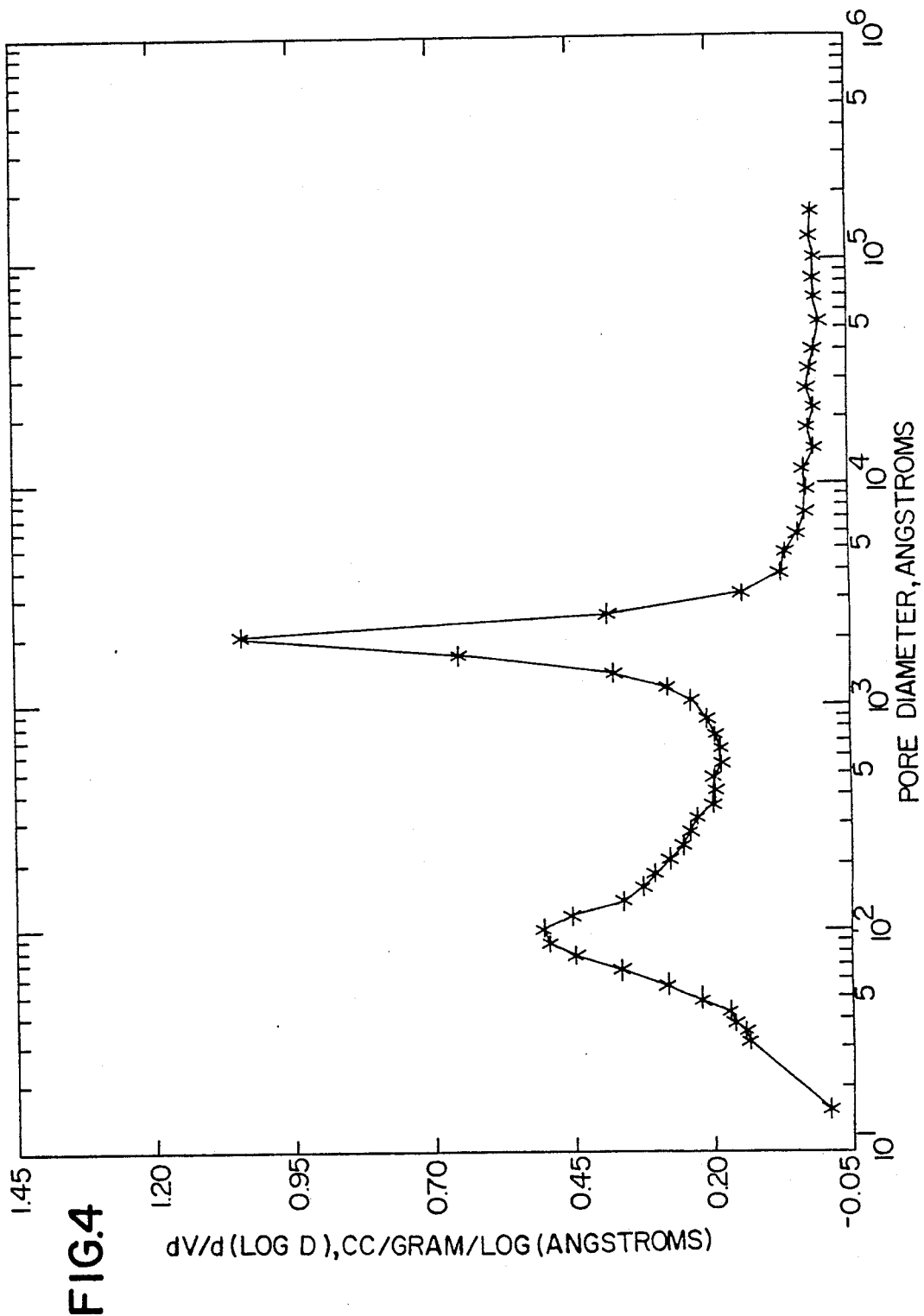
Figure 5:
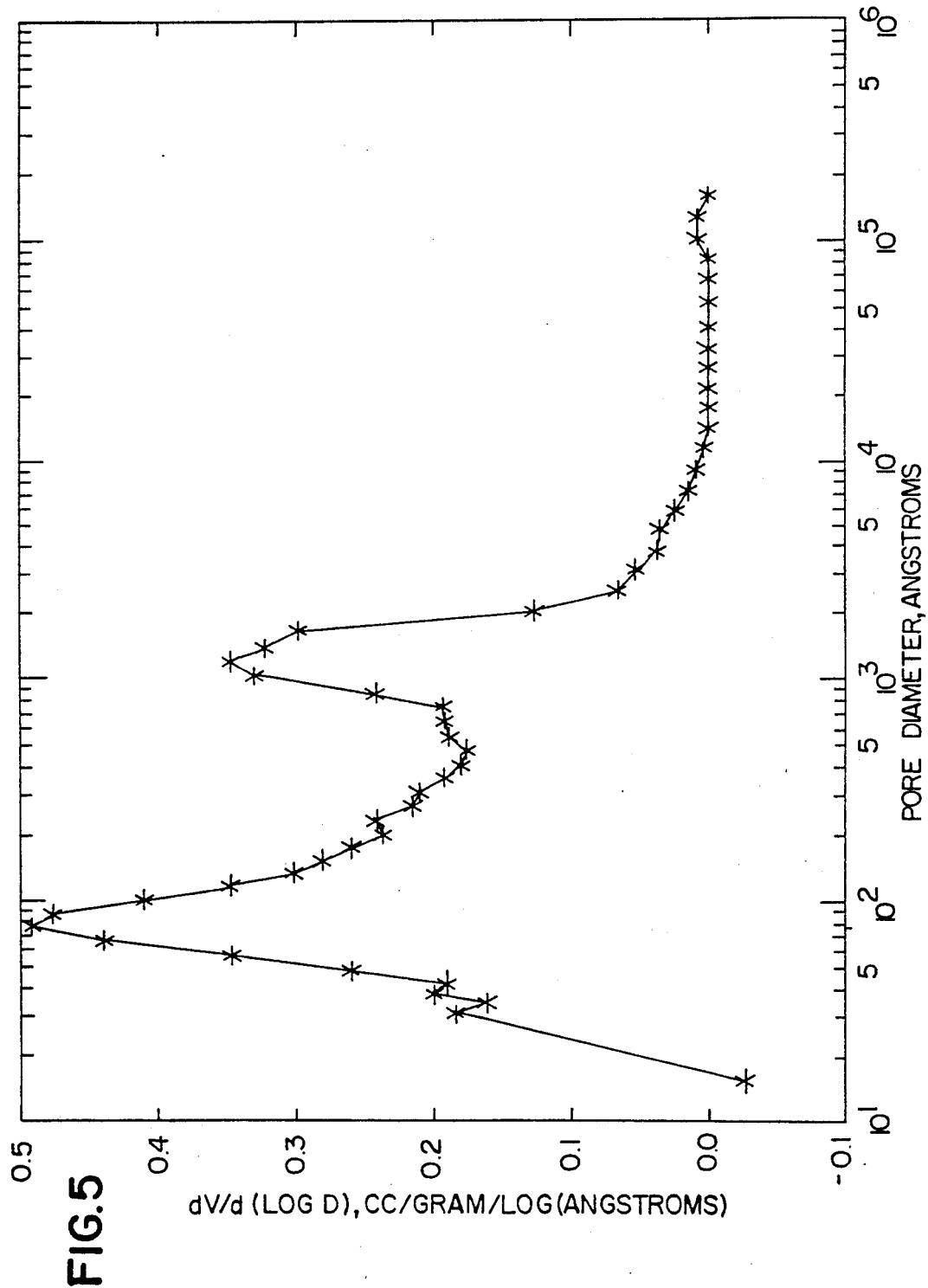
Figure 6:
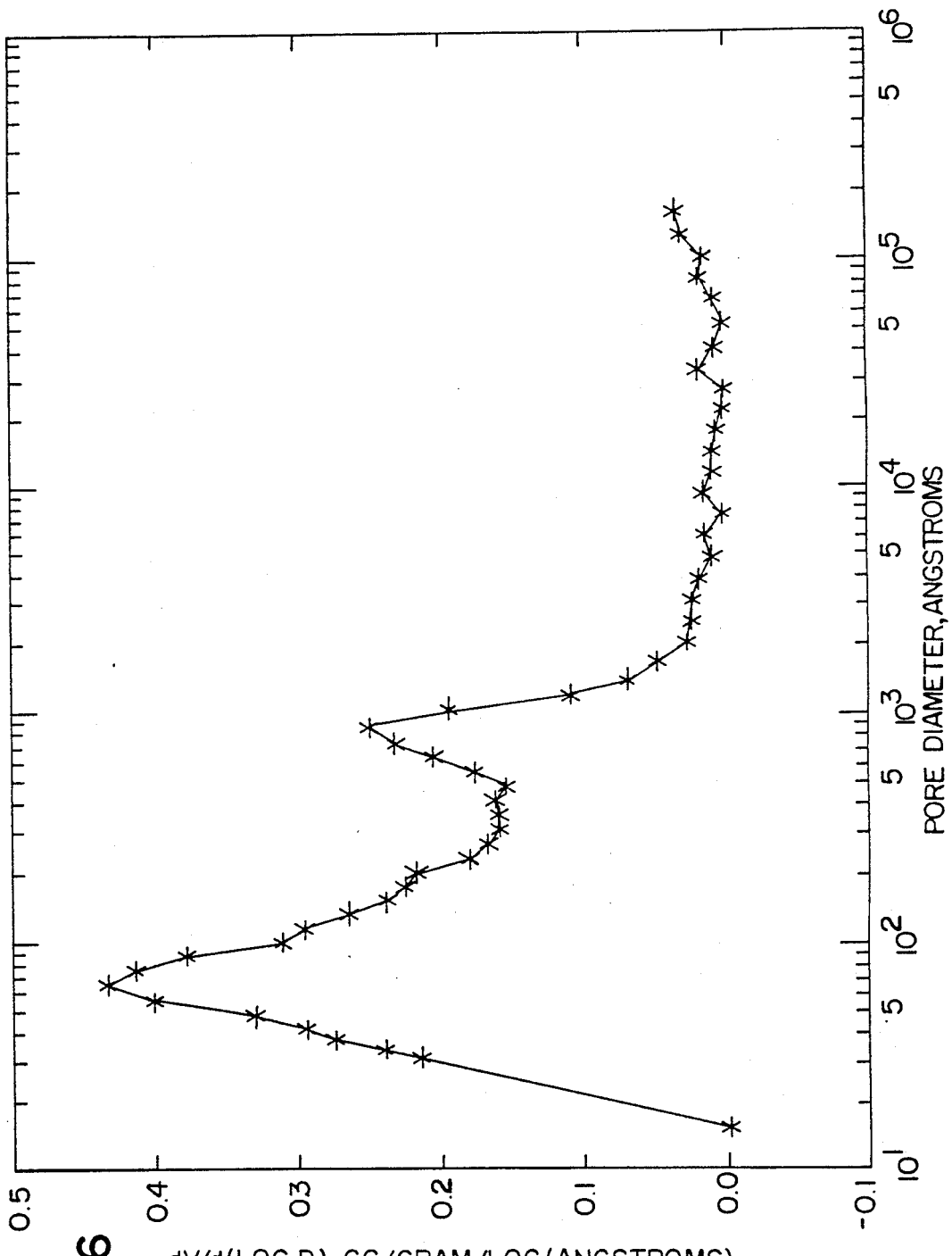

FIG. 2 shows k value as a function of substrate composition. Alcoa A is the above referenced CP-1 alumina; Alcoa B is CP-05 alumina. Water used for rehydration of the various substrate compositions is derivable from the "% solids" information in Table VII below.

Pore size distribution information for these four catalyst was as presented in FIGS. 3 to 6.

Increased packing density, i.e. increased provision of small particles to fill interstices between large particles, leads to greater k values. Increased packing an be achieved additionally by experimentally varying the amount of water used for rehydration and then measuring density, in order to find which amount of water gives maximum density for a given mix of rehydration bondable aluminas.

FIG. 7 gives the analytical results for C and H content of used catalyst. This shows that a carbonaceous material is deposited in the catalyst pores and that the coke content and composition seems to be related to the activity of the catalyst. Contrary to expectations, the 90 min. C concentration and C/H ratio of the carbonaceous material deposited in the catalyst are greater than those in the final data at 540 minutes. Further, it appears that with increased catalyst activity (i.e. k for HDN-7 is greater than k for HDN-3; see FIG. 2) there is a simultaneous increase in the removal of the carbonaceous material. Decreasing carbon deposition points to longer catalyst life and greater ability to accommodate ash.

EXAMPLES VI to IX

As presented in FIG. 8, samples were prepared as in Example I, except that aging was at 90° C., rather than 60° C., and there was 35 wt % CP-05, 65 wt % CP-1. As presented in FIG. 8, four different activation temperatures were used to investigate the effect of activation temperature on crystal structure and k.

Activation for Sample No. 6 was done by heating the sample in an air-atmosphere (2 SCFT/min air flow) oven on the schedule shown in Table IV:

TABLE IV

| Temperature | Rate | Hold Time at Max. Temp. of Range |
|---|---|---|
| room temp-200 | 15° C./min | Hold 30 min |
| 200-275 | 15° C./min | Hold 30 min |
| 275-350 | 15° C./min | Hold 30 min |
| 350-425 | 15° C./min | Hold 30 min |

Activation of Sample Nos. 13 to 15 was by heating rapidly up to the activation temperature, and then holding at the activation temperature for 16 hours. While higher temperatures are thought to remove small pores, this series of examples interestingly shows that the k value is not appreciably affected until over 700° C. when the crystal structure changes. This may indicate that activity is based on larger pores. Crush strength was 8, 17, 15, and 9 lbs., respectively.

EXAMPLES X to XII

Sample Nos. HDN-18, 19 and 20

As shown in Table V, k becomes greater as the amount of bayerite (trihydroxide) in the samples before activation increases relative to the amount of boehmite (monohydroxide).

These samples were prepared as in Example I, except that aging was at 50° C. for 1, 6 and 24 hours, respectively, for the purpose of varying the relative amounts of trihydroxide (bayerite) and monohydroxide (boehmite).

TABLE V

| Effect of Preactivated Alumina Composition Substrate Recipe: 50% CP-5 50 C./Time Variable | | | |
|---|---|---|---|
| HDN No.: | 18 | 19 | 20 |
| Time at 50° C., hrs. | 1 | 6 | 24 |
| | Properties | | |
| Unactivated: | | | |
| XRD: | | | |
| Trihydroxide % Intensity | 11 | 22 | 29 |
| Rel Crys Dia., A | 344 | 290 | 282 |
| Monohydroxide % Intensity | 36 | 32 | 24 |
| Rel Crys Dia., A | 73 | 73 | 73 |
| Tri-Intensity/ Mono-Intensity | 0.3 | 0.7 | 1.2 |
| Activated: | | | |
| SA, m²/g | 308 | 297 | 342 |
| XRD | Gamma-Chi → | | |
| Crush Strength, lbs. | 91 | 85 | 68 |
| k, $g_{oil}/g_{cat}$-hr | 17.9 | 20.6 | 22.4 |

EXAMPLES XIII to XIV

These Examples are designated HDN-1 and HDN-4, respectively, in the Tables. Experimental procedure was for Example I, except as otherwise indicated. HDN-4 was more active, i.e. had a greater k value, than HDN-1.

A possible explanation of the greater activity is that samples which contain boehmite plus amorphous material before activation perform better after fabrication into exploratory catalysts for HDN (hydrodenitrogenation) than do samples containing boehmite plus bayerite plus amorphous material when tested similarly. Activation changes boehmite into gamma alumina while such activation changes bayerite into eta alumina. This explanation is, however, contrary to the findings with respect to Examples X to XII.

Another possible explanation is the different pore volumes, HDN-4 having less pore volume over 10,000 Angstroms as compared to HDN-1.

Tables VI to X contain further information on the Examples.

TABLE VI

Na$_2$O Analysis
Wt % (Calcined Alumina Basis)

| | |
|---|---|
| HDN-1 | 0.47 |
| HDN-2 | 0.43 |
| HDN-3 | 0.70 |
| HDN-4 | 0.59 |
| HDN-8 | 0.56 |
| Remaining Examples Equal About | 0.5 |

TABLE VII

Property Characterization of HDN Substrates

| | HDN | | | | | | |
|---|---|---|---|---|---|---|---|
| | 1 | 2 | 3 | 4 | 7 | 8 | 9 |
| Description | | | | | | | |
| Type CP | 5 | 1 | 05 | 5 | 25% 1 75% 05 | 50% 1 50% 05 | 75% 1 25% 05 |
| % Solids | 50 | 50 | 34 | 50 | 38.8 | 42.5 | 46.2 |
| Aging Temp/Time | 60/4 | 60/4 | 60/4 | 90/4 | 60/6 | 60/4 | 60/4 |
| Properties | | | | | | | |
| Unactivated: | | | | | | | |
| XRD- | | | | | | | |
| Amorphous | Major | | | | | | |
| % Int of Peaks- | | | | | | | |
| Gibbsite | — | ND | — | ND | — | — | ND |
| Bayerite | — | ND | — | ND | — | — | ND |
| Gibb. + Bay. | 9 | — | 2 | — | <1 | <1 | <1 |
| Boehmite | 20 | 34 | 26 | 30 | 30 | 32 | 30 |
| Rel Crys Dia of Boeh, A | 63 | 67 | 59 | 75 | 64 | 65 | 68 |
| % LOI | 16.4 | 16.4 | 16.6 | 15.2 | 16.7 | 16.5 | 16.4 |
| Activated: | | | | | | | |
| SA, m$^2$/g | 326 | 303 | 340 | 327 | 364 | 352 | 335 |
| XRD | | | | | | | |
| Amorphous | M | M | M | M | — | — | — |
| Other | ND | ND | ND | vsm Boe | — | — | — |
| Crush Streng, lbs. | — | — | — | 36 | 24 | 28 | 46 |

KEY:
— = Not Done
ND = Not detected
M = Major
vsm = very small
XRD = X-ray diffraction
SA = Surface area
% LOI = % loss on ignition, (250 to 1100° C.)
A = Angstroms

TABLE VIII

Characterization of Alumina Substrates and Catalysts
Catalysts: 6% NiO 18% MoO$_3$

| | HDN-1 | -2 | -3 | -4 | -7 | -8 | -9 |
|---|---|---|---|---|---|---|---|
| SA Catalyst, m$^2$/g | 196 | 204 | 234 | 212 | — | — | — |
| PPM N in Oil | 515 | 545 | 565 | 530 | 532 | 551 | 615 |
| k, g$_{oil}$/g$_{cat}$-hr | 20.9 | 22.8 | 23.9 | 23.9 | 25.7 | 27.2 | 26.5 |
| % HDN | 74 | 77 | 80 | 80 | 81 | 84 | 84 |

KEY:
SA = Surface area
PPM N in Oil = Parts nitrogen per million parts oil
% HDN = % hydrodenitrogenated at time t = about 540 minutes

TABLE IX

Pore Size Distribution, Hg-Intrusion Porosimetry

| Pore Volume, cc/g Pore Diameter Ranges, A | HND-1 | -2 | -3 | -4 | -5 | -6 | -7 | -8 | -9 |
|---|---|---|---|---|---|---|---|---|---|
| >10,000 *(Corr) | 0.40 | 0.01 | 0.06 | 0.03 | 0 | 0.03 | 0 | 0 | 0.01 |
| 5,000–10,000 | 0.18 | 0.01 | 0.06 | 0.24 | 0.01 | 0.06 | 0.02 | 0.02 | 0.03 |
| 1,000–5,000 | 0.14 | 0.08 | 0.85 | 0.14 | 0.02 | 0.73 | 0.62 | 0.41 | 0.19 |
| 500–1,000 | 0.04 | 0.14 | 0.13 | 0.05 | 0.12 | 0.14 | 0.13 | 0.13 | 0.16 |
| 200–500 | 0.06 | 0.17 | 0.18 | 0.07 | 0.21 | 0.23 | 0.19 | 0.20 | 0.18 |
| 100–200 | 0.08 | 0.17 | 0.26 | 0.06 | 0.21 | 0.31 | 0.26 | 0.23 | 0.22 |

TABLE IX-continued

| | Pore Size Distribution, Hg-Intrusion Porosimetry | | | | | | | | |
|---|---|---|---|---|---|---|---|---|---|
| Pore Volume, cc/g Pore Diameter Ranges, A | HND-1 | -2 | -3 | -4 | -5 | -6 | -7 | -8 | -9 |
| 30-100 | 0.29 | 0.41 | 0.33 | 0.34 | 0.45 | 0.37 | 0.37 | 0.39 | 0.40 |
| Total Pore Volume *(Corr) | 1.19 | 0.99 | 1.87 | 0.94 | 1.01 | 1.87 | 1.58 | 1.38 | 1.18 |
| *Interparticle Correction cc/g | 0.32 | 0.18 | 0.65 | 0.01 | 0.01 | 0.14 | 0.06 | 0.06 | 0.02 |

Note:
The >10,000 and Total Pore Volume have been corrected ("Corr") by subtraction of the indicated Interparticle Correction.
The Interparticle Correction is the amount of pore volume contributed by the interstices between particles.

TABLE X

| | Pore Size Distribution, Hg-Intrusion Porosimetry | | |
|---|---|---|---|
| Pore Volume, cc/g Pore Diameter Ranges, A | HDN-18 | HDN-19 | HDN-20 |
| >10,000 *(Corr) | 0.10 | 0.10 | 0.10 |
| 5,000-10,000 | 0.06 | 0.06 | 0.06 |
| 1,000-5,000 | 0.20 | 0.20 | 0.18 |
| 500-1,000 | 0.05 | 0.05 | 0.04 |
| 200-500 | 0.07 | 0.09 | 0.06 |
| 100-200 | 0.10 | 0.09 | 0.08 |
| 30-100 | 0.25 | 0.18 | 0.33 |
| Total Pore Volume *(Corr) | 0.83 | 0.77 | 0.85 |

*See Note at bottom of Table IX.

All percentages are by weight, unless noted otherwise. All temperatures are in °C., unless noted otherwise.

"% Solids" was determined by dividing the weight of the alumina powder by the total weight of the alumina powder plus the water used.

While the invention has been described in terms of preferred embodiments, the claims appended hereto are intended to encompass all embodiments which fall within the spirit of the invention.

What is claimed is:

1. The method of tailoring pore size distribution comprising mixing particles of rehydration bondable alumina of different pore size distribution.

2. A method as claimed in claim 1, further comprising bonding the mixed particles together.

3. The method of making a catalyst substrate yielding increased catalytic activity, comprising mixing rehydration bondable aluminas of different median particle size and bonding the particles of the rehydration bondable aluminas together to form the substrate.

4. The method of making a catalyst substrate yielding increased catalytic activity, comprising mixing rehydration bondable alumina with an amount of water of rehydration yielding maximum density in the resulting bonded alumina.

5. An alumina substrate of bonded rehydration bondable alumina, the substrate giving a k-value of at least 25 when tested as in the test of Example I.

6. A substrate as claimed in claim 5, wherein the k-value is at least 26.

7. A substrate as claimed in claim 6, wherein the k-value is at least 27.

8. An alumina substrate comprising mixed and bonded rehydration bondable aluminas of different median particle size.

9. An alumina substrate of bonded rehydration bondable alumina, the substrate having a tri-intensity/monointensity of 0.7 or greater.

* * * * *